United States Patent [19]
Walker

[11] Patent Number: 5,282,051
[45] Date of Patent: Jan. 25, 1994

[54] APPARATUS AND METHOD FOR PERFORMING RESOLUTION CONVERSION ON IMAGE DATA WITH AUTO CORRELATION

[75] Inventor: John O. Walker, Rochester, N.Y.

[73] Assignee: Xerox Corporation, Stamford, Conn.

[21] Appl. No.: 737,297

[22] Filed: Jul. 29, 1991

[51] Int. Cl.$^5$ .............................................. H04N 1/387
[52] U.S. Cl. ...................................... 358/401; 382/42; 382/50
[58] Field of Search ..................... 358/78, 401, 80, 76; 395/131, 128, 132; 382/50, 42; H04N 1/387

[56] References Cited

U.S. PATENT DOCUMENTS

| | | | |
|---|---|---|---|
| 4,409,614 | 10/1983 | Eichler et al. | 358/76 |
| 4,962,421 | 10/1990 | Murai | 358/78 |
| 5,103,306 | 4/1992 | Weiman et al. | 358/133 |

Primary Examiner—Edward L. Coles, Jr.
Assistant Examiner—Jill Jackson
Attorney, Agent, or Firm—Gary B. Cohen

[57] ABSTRACT

A method for use in a system of the type capable of manipulating digital images represented by a plurality of original image pixels is provided. In the preferred embodiment, the system has a memory for storing images and an image output terminal. Additionally, the method includes a step of deriving an intensity value for a selected output pixel in a set of output pixels from a plurality of input pixels in a set of input pixels, each of the plurality of input pixels having a corresponding intensity value contributing to the intensity value of the selected output pixel. The step of deriving the intensity value of the selected output pixel preferably comprises the steps of mapping, in the memory, the set of output pixels to the set of input pixels so that each of the plurality of input pixels is adjacent the selected output pixel, as well as reading the plurality of input pixels from the memory. After determining a correlation value for each of the plurality of input pixels with a correlation function, the correlation values of the plurality of input pixels can be summed with the corresponding respective intensity values of the plurality of input pixels to obtain the intensity value of the selected output pixel.

12 Claims, 6 Drawing Sheets

$$\frac{\text{MSB}}{a_0} \quad \frac{1}{a_1} \quad \frac{1}{a_2} \quad \frac{1}{a_3} \quad \frac{1}{a_4} \quad \frac{1}{a_5} \quad \frac{1}{a_6} \quad \frac{1}{a_7} \quad \frac{1}{a_8} \quad \frac{1}{a_9} \quad \frac{1}{a_{10}} \quad \frac{1}{a_{11}}$$

*FIG. 8A*

$$\frac{1}{a_0} \quad \frac{\text{MSB}}{a_1} \quad \frac{1}{a_2} \quad \frac{1}{a_3} \quad \frac{1}{a_4} \quad \frac{1}{a_5} \quad \frac{1}{a_6} \quad \frac{1}{a_7} \quad \frac{1}{a_8} \quad \frac{1}{a_9} \quad \frac{1}{a_{10}} \quad \frac{1}{a_{11}}$$

*FIG. 8B*

$$\text{AND} \begin{cases} \dfrac{1}{B10} \quad \dfrac{\text{MSB}}{1} \quad \dfrac{1}{1} \quad \dfrac{1}{1} \quad \dfrac{1}{1} \quad \dfrac{1}{1} \quad \dfrac{1}{1} \quad \dfrac{1}{1} \quad \dfrac{1}{1} \quad \dfrac{1}{1} \quad \dfrac{1}{1} \quad \dfrac{1}{1} \end{cases}$$

$$= \quad \dfrac{B10}{\,} \quad \dfrac{\text{MSB}}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,}$$

*FIG. 8C*

$$\frac{1}{a_0} \quad \frac{B10}{a_1} \quad \frac{\text{MSB}}{a_2} \quad \frac{1}{a_3} \quad \frac{1}{a_4} \quad \frac{1}{a_5} \quad \frac{1}{a_6} \quad \frac{1}{a_7} \quad \frac{1}{a_8} \quad \frac{1}{a_9} \quad \frac{1}{a_{10}} \quad \frac{1}{a_{11}}$$

*FIG. 8D*

$$\text{AND} \begin{cases} \dfrac{1}{B9} \quad \dfrac{B10}{1} \quad \dfrac{\text{MSB}}{1} \quad \dfrac{1}{1} \quad \dfrac{1}{1} \quad \dfrac{1}{1} \quad \dfrac{1}{1} \quad \dfrac{1}{1} \quad \dfrac{1}{1} \quad \dfrac{1}{1} \quad \dfrac{1}{1} \quad \dfrac{1}{1} \end{cases}$$

$$= \quad \dfrac{B9}{\,} \quad \dfrac{B10}{\,} \quad \dfrac{\text{MSB}}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,} \quad \dfrac{1}{\,}$$

*FIG. 8E*

$$\frac{B0}{a_0} \quad \frac{B1}{a_1} \quad \frac{B2}{a_2} \quad \frac{B3}{a_3} \quad \frac{B4}{a_4} \quad \frac{B5}{a_5} \quad \frac{B6}{a_6} \quad \frac{B7}{a_7} \quad \frac{B8}{a_8} \quad \frac{B9}{a_9} \quad \frac{B10}{a_{10}} \quad \frac{\text{MSB}}{a_{11}}$$

*FIG. 8F*

APPARATUS AND METHOD FOR PERFORMING RESOLUTION CONVERSION ON IMAGE DATA WITH AUTO CORRELATION

BACKGROUND OF THE INVENTION

1. Field of the Invention

The present invention relates generally to a resolution conversion technique for use in a system capable of manipulating digital images represented by a plurality of original image pixels, and more specifically to a method, capable of being used in an electroreprographic machine, for deriving an intensity value of a selected output pixel in a bitmap, the bitmap including the selected output pixel mapped to a plurality of correlated, neighboring input pixels.

2. Description of the Prior Art

Image information, be it color or black and white, is commonly generated in a bitmap format at a particular scale, and resolution $K \times L \times b$, corresponding to a desired printer output, where K is a number of spots per unit of length in one dimension, L is a number of spots per unit length in the other dimension, and b is the depth of each pixel, in number of levels. This bitmap is present for every color separation of the output device, i.e., 4 bitmaps for a 4-color output device, 3 for a 3-color, 2 for a 2-color and 1 for a black and white output device. In a common example of a black and white output, image data comprising a bitmap to be printed is provided to a printer suitable for printing at 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation also usually provide only a single resolution output.

Increasingly, the resolution available from printers varies over a wider range of choices. Printer resolutions are available over a range, for example, from less than 200 spi to more than 600 spi. Resolutions vary for a number of reasons, generally related to the quality of the output image. Simply printing a 300 spi bitmap at 400 spi or 600 spi is undesirable however, since the image will be reduced substantially in size on the output page or display. On the other hand, printing a 400 spi bitmap at 300 spi is undesirable since the image is simply enlarged, and commonly is visibly distorted at the lesser resolution. It would be highly desirable to provide the capability of printing any image at any resolution, while selecting the output size.

A system for manipulating binary digital images represented by a plurality of original image pixels is disclosed in U.S. patent application Ser. No. 07/513,415, entitled "Bit-Map Image Resolution Converter" ("Resolution Converter Application"), filed Apr. 23, 1990, the relevant portions of which are incorporated herein by reference. The Resolution Converter Application contemplates a method of magnifying, by a predetermined magnification factor (n), the original image pixels in two dimensions. The method includes the steps of selecting an original image pixel, as well as determining the binary state of both the selected original image pixel and all immediately surrounding original image pixels. Additionally, the selected original image pixel is expanded into an $n \times n$ array of magnified image pixels to represent the magnification of the selected original image pixel. Finally, a binary state is assigned to each pixel in the array of magnified image pixels according to the pattern of binary signals previously determined for the selected original image pixel and all immediately surrounding original image pixels.

In the preferred embodiment of the Resolution Converter Application, the assignment of the binary states to the pixels in the array of magnified image pixels is made according to a set of state determination rules. While the system of the Resolution Converter Application is well suited for performing resolution conversion under certain conditions, it is limited in its application. In particular, this system is only intended for magnifying a stored binary image by an integral value. Additionally, the state determination rules were apparently generated on an iterative basis rather than in accordance with a generic probabilistic function. It would be highly desirable to provide a technique in which resolution conversion is achieved in accordance with a mathematical function instead of a set of rules, and a stored image can be magnified or reduced by both integral and non-integral values.

SUMMARY OF THE INVENTION

In accordance with the present invention, a method is provided for use in a system of the type capable of manipulating digital images represented by a plurality of original image pixels. In the preferred embodiment, the system has a memory for storing images and means for outputting the images. Additionally, the method includes a step of deriving an intensity value for a selected output pixel in a set of output pixels from a plurality of input pixels in a set of input pixels, each of the plurality of input pixels having a corresponding intensity value contributing to the intensity value of the selected output pixel. The step of deriving the intensity value of the selected output pixel preferably comprises the steps of mapping, in the memory, the set of output pixels to the set of input pixels so that each of the plurality of input pixels is adjacent the selected output pixel, as well as reading the plurality of input pixels from the memory. After determining a correlation value for each of the plurality of input pixels with a correlation function, the correlation values of the plurality of input pixels can be summed with the corresponding respective intensity values of the plurality of input pixels to obtain the intensity value of the selected output pixel.

In an aspect of the disclosed embodiment, the step of deriving the intensity value of the selected output pixel comprises the above-mentioned mapping and reading steps as well as a step in which a multi-bit index word is formed from the corresponding intensity values of the plurality of input pixels. This aspect further comprises a step of providing a table having a plurality of preselected reference words and intensity values respectively assigned thereto—the plurality of preselected reference words and respectively assigned intensity values being ordered in a sequence, the sequence varying in accordance with a correlation function. The intensity value or the selected output pixel can be determined by matching the multi-bit index word with one of the preselected reference words and its respectively assigned intensity value.

In another aspect of the disclosed embodiment, the correlation function is a Gaussian-like correlation function, which Gaussian-like correlation function is characterized by the expression:

$$W(i,j) = C*(e^{-0.5(x(i)-X_c)/\sigma_x)^2} * e^{-0.5*(y(j)-Y_c)/\sigma_y)^2})$$

In yet another aspect of the disclosed embodiment the method further comprises the steps of designating a pivot point $(X_C, Y_C)$ for the selected output pixel and disposing the centers of the plurality of input pixels substantially within a window centered about the pivot point. In one example, the size of the window, which size can be optimized, varies as a function of the correlation function. Moreover, the window can be characterized by an ellipse.

Numerous features of the conversion technique will be apparent to those skilled in the art. First the conversion technique is conceived generically, i.e. the conversion can use a single correlation function to solve one of many resolution cases. Consequently, each conversion can be performed, with a high degree of precision and accuracy, over a broad range of resolutions. Second, the input image can be magnified or reduced, with great clarity, for both integral and nonintegral values. Finally, the conversion technique can be performed easily and inexpensively since it can be readily implemented in software.

These and other aspects of the invention will become apparent from the following description, the description being used to illustrate a preferred embodiment of the invention when read in conjunction with the accompanying drawings.

DESCRIPTION OF THE DRAWINGS

FIGS. 8A-8F are schematic, sequential views of a register being loaded with a multi-bit index word characterizing the correlated intensities of a given window of input pixels.

DESCRIPTION OF A PREFERRED EMBODIMENT OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
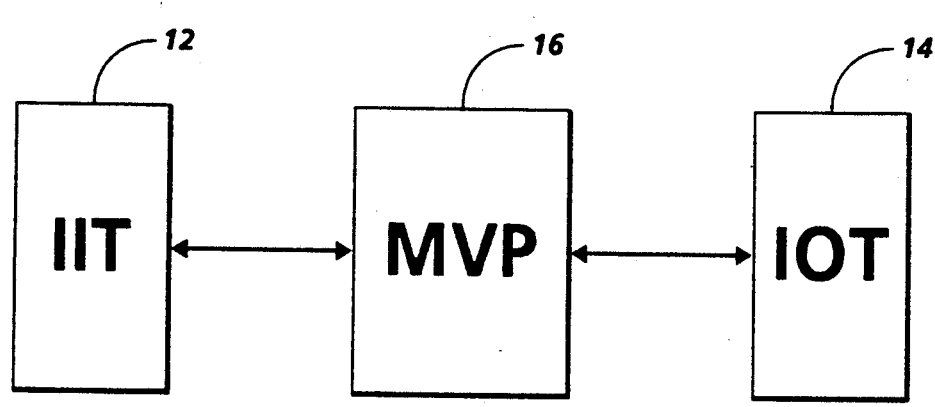
FIG. 1 is a schematic, block diagrametric view of an apparatus in which the method of the present invention can be performed.

Referring to FIG. 1, a block diagram of an apparatus, upon which the method of the present invention can be performed, is designated by the numeral 10. Generally, the apparatus 10 comprises an image input terminal (IIT) 12, image output terminal (IOT) 14, and a main video processor (MVP) 16. In one example (FIG. 2), the IIT 12 includes a scanning section 18 having an automatic document handler (ADH) 20 for automatically and sequentially placing one or more documents on a transparent platen 22. In this example, the scanning section 18 employs one or more linear scanning arrays 24, which arrays 24 may comprise charge coupled devices (CCDs) supported below and in scanning relation to the platen by a carriage 26. To scan a document placed on the platen 22, the carriage 26 can be reciprocated by conventional reciprocating means 28. It will be appreciated by those skilled in the art that in other contemplated embodiments, the IIT 12 could be an input other than the scanning section 18, such as a computer workstation, a facsimile device, a CD ROM, or other like I/O devices.

Figure 2:
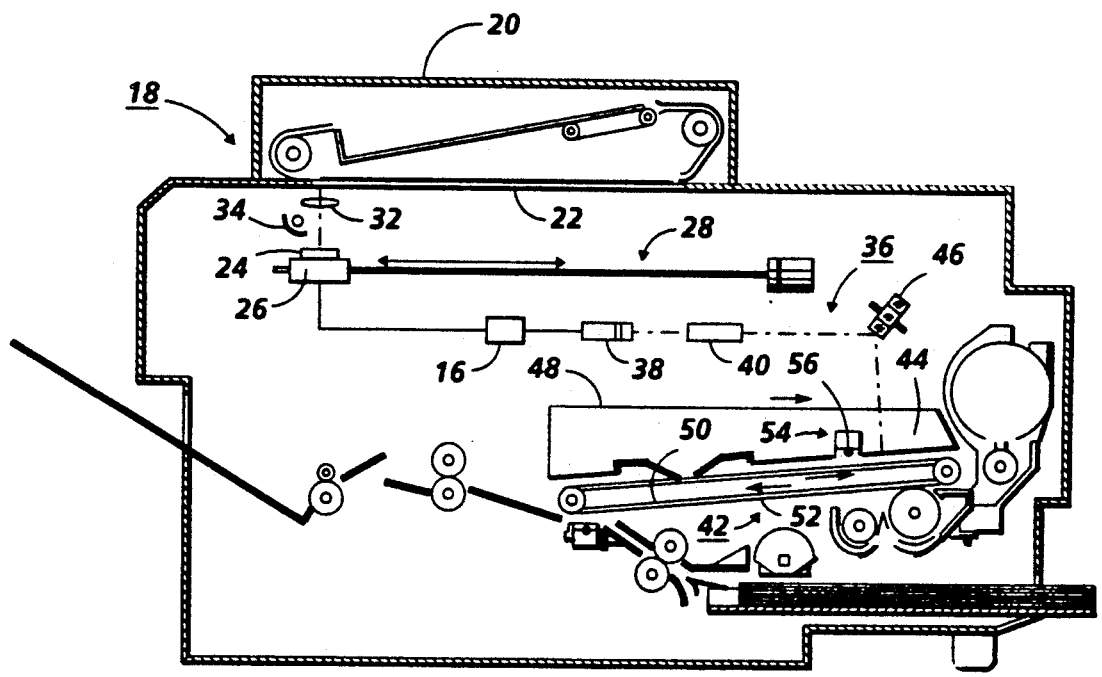
FIG. 2 is a schematic, sectional, partially block-diagrametric view of an electroreprographic machine in which the method can be performed.

In the illustrated example of FIG. 2, a suitable lens 32 is provided to focus arrays 24 on a line-like segment of the platen 22 and the documents resting thereon. Additionally, a suitable lamp 34 illuminates the document line being scanned. Arrays 24 provide electrical image data or pixels representative of the document image scanned which are inputted to the MVP 16 by a suitable IIT interface (not shown).

Referring still to the example of FIG. 2, the IOT 14 includes a raster output scanner (ROS) 36 having a suitable source of high intensity light, such as laser 38, modulated in accordance with the content of the image data as by an acousto-optic modulator 40 to provide zero and first order imaging beams. As will be understood, the image data may be used for purposes other than printing copies, as for example, the image data could be transmitted from the MVP 16 to one of a number of devices, such as a CRT or a thermal ink jet printer. Moreover the image data could be transmitted from the MVP 16 to another location, via a communication channel (not shown), or stored for later use, etc. In the example with the ROS 36, the imaging beam is scanned across a photoreceptor 42 at an exposing station 44 by a scanning polygon 46 to expose the previously charged photoreceptor 42 and create a latent electrostatic image or the document represented by the image signals to modulator 40. Suitable means (not shown) are employed to focus the beam on the photoreceptor 42.

The exemplary electroreprographic machine 10 illustrated in FIG. 2 employs a removable processing cartridge 48 including the photoreceptor 42, which in one example comprises a belt like member 50, the outer periphery of the belt like member 50 being coated with a suitable photoconductive material 52. Initially, the belt 50 moves the photoconductive surface 52, in a known manner, through a charging station 54 wherein the belt 50 is uniformly charged with an electrostatic charge placed on the photoconductive surface 52 by charge corotron 56 in known manner preparatory to imaging. Thereafter, the belt 50 is driven to the exposure station 44 wherein the charged photoconductive surface 52 is exposed to line-by-line scanning of the ROS 36, whereby the charge is selectively dissipated in the light exposed regions to record the original input image in the form of electrostatic latent image. Further detailed explanation of the exemplary electroreprographic machine 10 illustrated in FIG. 2 may be obtained by reference to U.S. patent application Ser. No. 07/784,493, entitled "Bus Arbitratition Scheme for Facilitating Operation of a Printing Apparatus," filed Oct. 29, 1991, the pertinent portions of which are incorporated herein by reference.

Figure 3:
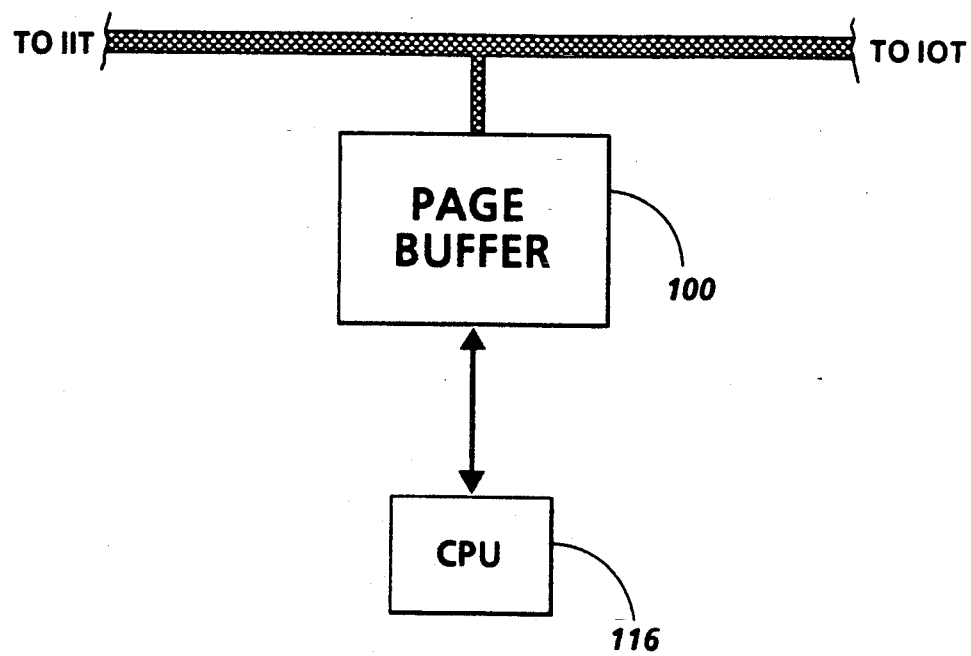
FIG. 3 is a schematic, block diagrametric view of a network used to perform a software implementation of the present invention.

Referring to FIG. 3, a portion of the MVP 16 is shown in further detail. The resolution conversion method disclosed of the present invention can be implemented by writing image data of the input image into a memory section 100, which memory section 100 in one example is a page buffer of the type described in the VP Application. In the preferred embodiment, digital image information in the form of image data picture elements ("pixels"), digital voltage representations of image intensity at discrete locations in an image, is provided from the IIT 12. As mentioned above, image data pixels constitute the response of photosites indicating the intensity of light detected at the photosites over a given period.

Figure 4:
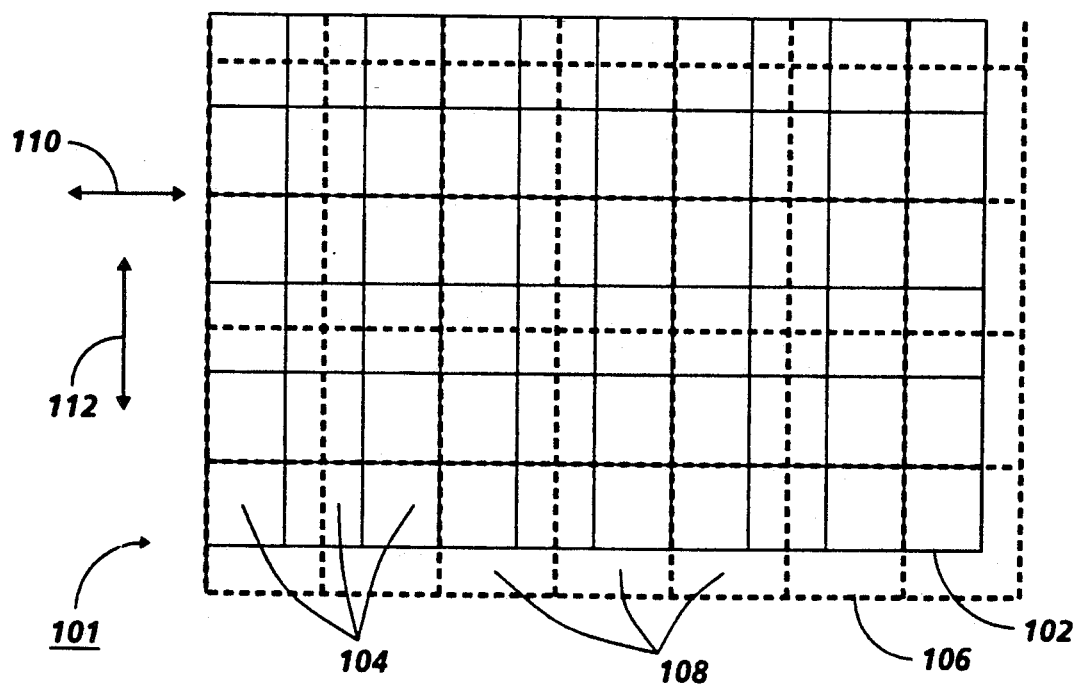
FIG. 4 is a schematic view of a bitmap with an array of output pixels mapped to an array of input pixels.

Referring to FIG. 4, a portion of a bitmap 101 of memory section 100, in which the image data can be manipulated, is shown. The partial bitmap 101 comprises a portion of an array 106 of i×j output pixels 108 mapped on a portion of an array 102 of i×j input pixels 104. As is conventional, the arrays 102,106 are characterized by a fast scan direction and a slow scan direction, and the pixels 104,108 are positioned along scan lines. The fast and slow scan directions are respectively indicated by the by the arrows 110 and 112. Additionally, arrays 102,106 are defined by respective resolutions in the fast scan direction and the slow scan direction. Finally, when converting and printing images, the pixels 104,108 will possess characteristic intensities, ranging from white to black. As will be evident from the discussion below, the method can be performed with binary images as well as images having various levels of halftones. Additionally, it should be appreciated that the method is equally applicable to resolution conversions of black/white or color images.

Figure 5:
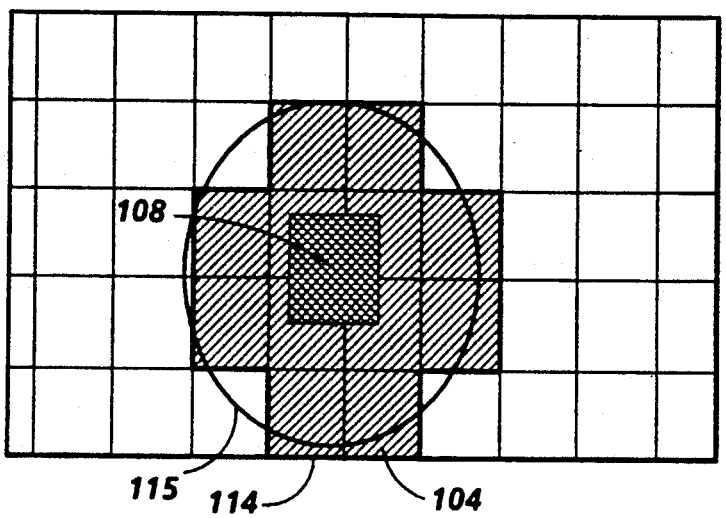
FIG. 5 is a schematic view of the bitmap of FIG. 4 with a selected output pixel surrounded by a "window" of adjacent input pixels.

Referring to FIG. 5, some of the theory underlying the development of steps used to obtain an intensity value for a selected output pixel 108 in bitmap 101, i.e. Z, is discussed in further detail. A first step is directed toward determining the spatial relationship between the input image and the output image. Some of the pertinent variables and parameters of the present method can be expressed as follows:

Pxi—Input pixel size in the fast scan direction
Pyi—Input pixel size in the slow scan direction
Pxo—Output pixel size in the fast scan direction.
Pyo—Output pixel size in the slow scan direction.
Rxi—Input resolution in the fast scan direction.
Ryi—Input resolution in the slow scan direction.
Rxo—Output resolution in the fast scan direction.
Ryo—Output resolution in the slow scan direction.
I(i,j)—Input image intensity of pixel @ (i,j)
Z(i,j)—Output image intensity of pixel @ (i,j)
Ni—Number of pixels per scan line in input image
Mi—Number of scan lines in input image
No—Number of pixels per scan line in output image
Mo—Number of scan lines in output image The ratio of the input to output resolution is employed to determine the output pixel size, number of pixels per scan line and number of scan lines in the output image as follows:

$$Pxo = Pxi(Rxi/Rxo) \tag{1}$$

$$Pxi = Pyi(Ryi/Ryo) \tag{2}$$

$$No = Ni(Rxi/Rxo) \tag{3}$$

$$Mo = Mo(Rxi/Rxo) \tag{4}$$

Referring specifically to FIG. 5, a second step is directed toward determining a center of Pivot Point $(X_C, Y_C)$ of the cross-hatched, selected output pixel 108 with the following equations:

$$X_C = (n + 0.5)Pxo, \quad n = 0, 1, 2, \ldots No \tag{5}$$

$$Y_C = (m + 0.5)Pxi, \quad m = 0, 1, 2, \ldots Mo \tag{6}$$

The process of choosing input pixels 104 in the neighborhood of the Pivot Point $(X_C, Y_C)$ is referred to as "windowing." A window of input pixels 104 (FIG. 5), centered about the Pivot Point $(X_C, Y_C)$, is designated by the numeral 114. In the preferred embodiment, the window 114 is defined by input pixels 104 whose respective centers are within a predetermined area, such as an ellipse 115 having its center at the Pivot Point $(X_C, Y_C)$. The ellipse 115 preferably corresponds to at least a portion of a base of the Gaussian-like correlation function of FIG. 6. As explained in further detail below, it has been found that the resolution conversion is optimized when the perimeter of the prescribed ellipse extends a distance of $3\sigma$. As will be appreciated by those skilled in the art, the term $3\sigma$ refers to a horizontal distance measured from the center of the correlation function of FIG. 6.

It has been observed that the size of the window 114 varies as a function of the sizes of both the input pixels 104 and output pixels 108. Experimentation indicates that the size of window 114 is optimized by use of the following equations:

$$3\sigma_x = 0.7Pxo + 2.1(Pxi - Pxo)(Rxi/Rxo) \text{ for } Rxo/Rxi > 1 \tag{7}$$

$$3\sigma_x = 0.7Pxi + 2.1(Pxo - Pxi)(Rxi/Rxo) \text{ for } Rxo/Rxi < 1 \tag{8}$$

$$3\sigma_y = 0.7Pyo + 2.1(Pyi - Pyo)(Ryi/Ryo) \text{ for } Ryo/Ryi > 1 \tag{9}$$

$$3\sigma_y = 0.7Pyi + 2.1(Pyo - Pyi)(Ryi/Ryo) \text{ for } Ryo/Ryi < 1 \tag{10}$$

The size of window 114 can be further optimized by use of the parameters $Q_X$ and $Q_Y$ as follows:

$$3\sigma_x = 0.7Pxo + 2.1(Pxi - Pxo)(Rxi/Rxo))*Q_x \text{ for } Rxo/Rxi > 1 \tag{7a}$$

$$3\sigma_x = 0.7Pxi + 2.1(Pxo - Pxi)(Rxi - Rxo))*Q_x \text{ for } Rxo/Rxi < 1 \tag{8a}$$

$$3\sigma_y = 0.7Pyo + 2.1(Pyi - Pyo)(Ryi/Ryo))*Q_y \text{ for } Ryo/Ryi > 1 \tag{9a}$$

$$3\sigma_y = 0.7Pyi + 2.1(Pyo - Pyo)(Ryi/Ryo))*Q_y \text{ for } Ryo/Ryi < 1 \tag{10a}$$

In the above equations (as well as in all of the equations below) the operator "*" is used to designate multiplication. Additionally, in Equations 7A–10A, $Q_X$ and $Q_Y$ are typically in the range of 0.85–5.0.

For each given window 114 (FIG. 5), the input pixels 14 thereof can be correlated with a correlating function. Ideally, the properties of the correlating function closely approximate the correlation of the neighboring input pixels 104 in the vicinity of the Pivot Point ($X_C$, $Y_C$). It has been observed, through experimentation, that the input pixels 104 closest to the Pivot Point ($X_C$, $Y_C$) of a selected output pixel 108 will afford a relatively greater contribution to the intensity of the selected output pixel 108 than will the input pixels 104 that are farther from the Point ($X_C$, $Y_C$). Indeed, for continuous tone images, a Gaussian-like contribution from neighboring input pixels 104 can be observed. Based on this observation, the following Gaussian-like correlation function can be used to correlate the input pixels 104 in the given window 114:

$$W(i,j) = C*(e^{-0.5(x(i)-X_C/\sigma_x)^2} * e^{-0.5*(y(j)-Y_C/\sigma_y)^2}) \quad (11)$$

where, C is a normalization constant, and, x(i) and y(j) are locations of the input pixels in the input image.

Figure 6:
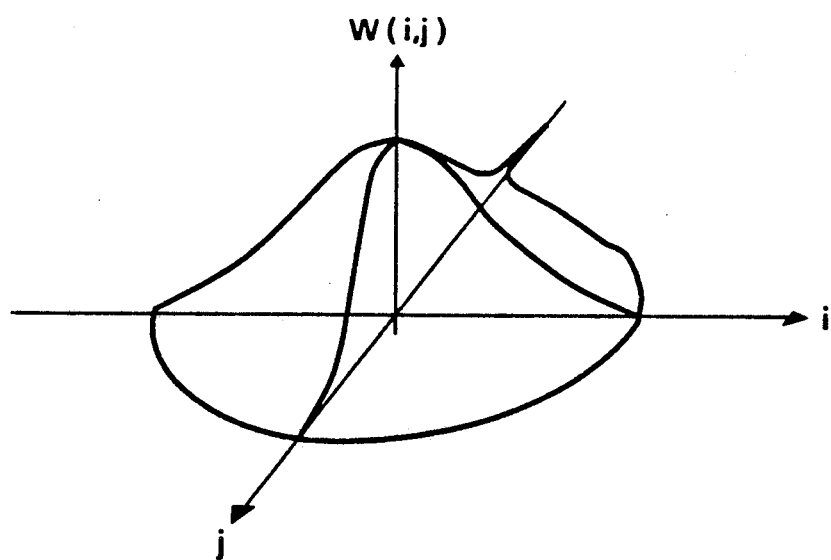
FIG. 6 is a graphical representation of a Gaussian-like correlation function used to correlate a given window of input pixels.

Referring to FIG. 6, a graphical representation of Equation (11) is shown. In accordance with accepted mathematical practice, W(i,j) can be normalized such that:

$$\sum_{i,j} W(i,j) = 1 \quad (12)$$

W(i,j) is normalized with the following normalization constant:

$$C = \left( \sum_{i,j} (e^{-0.5(x(i)-XC/\sigma x)2} * e^{-0.5*(y(j)-YC/\sigma y)2}) \right)^{-1} \quad (13)$$

Referring to FIG. 5 and the discussion above, the intensity value of the selected output pixel 108, i.e. Z, can be determined with the following expression:

$$Z = \sum_{i,j} I(i,j) * W(i,j) \quad (14)$$

in which the value of Z ranges from the minimum to the maximum intensity

It will be appreciated by those skilled in the art that W(i,j) could be defined by a correlation function other than a Gaussian-like correlation function. For example, W(i,j) could assume a form similar to that of other probabilistic functions, such as sin u/u.

In reducing the method of the present equation to practice, binary 600×600 spi images were converted to and printed at 400×400 spi, images having two intermediate levels of gray. As mentioned above, however, the method is neither limited to binary images, nor images having just two intermediate levels of gray. Although the details of the converted images were quite sharp and clear, moire patterns were present. It stands to reason that the moire patterns could be alleviated or substantially eliminated by using an adaptive screen detection and diffusion technique along with the method of the present invention.

In the preferred embodiment, the size of the window 114 was optimized to generate the most accurate representation of the original image. In one approach an iterative technique was employed to minimize error between an image of an original and a corresponding "round robin" image. As will be recognized by those skilled in the art, round robin conversion refers to converting the image to a selected resolution and then converting it back to the original resolution. In particular, the total error resulting from each iteration of the round robin was calculated and a new window size determined with a known gradient technique. In accordance with the gradient technique the size of window 114 converges to a solution in which the total error is minimized. It is contemplated that for certain correlation functions other than Gaussian-like correlation functions, non-iterative optimization techniques could be employed.

It will be recognized that Equatons 11-14 can be solved with a network employing conventional hardware (not shown) or with processing means using software. Referring again to FIG. 3, a software implementation can be accomplished with a combination of the memory section 100 and a CPU 116, such as a MC68020 microprocessor manufactured by Motorola Corporation. Generally, the software implementation is accomplished by matching a characteristic index word, "L", constructed from correlated intensities of the input pixels 104 of window 114 with a reference word (Table 1), each reference word having an intensity value assigned thereto. A detailed explanation of the software implementation follows below.

Figure 7A:
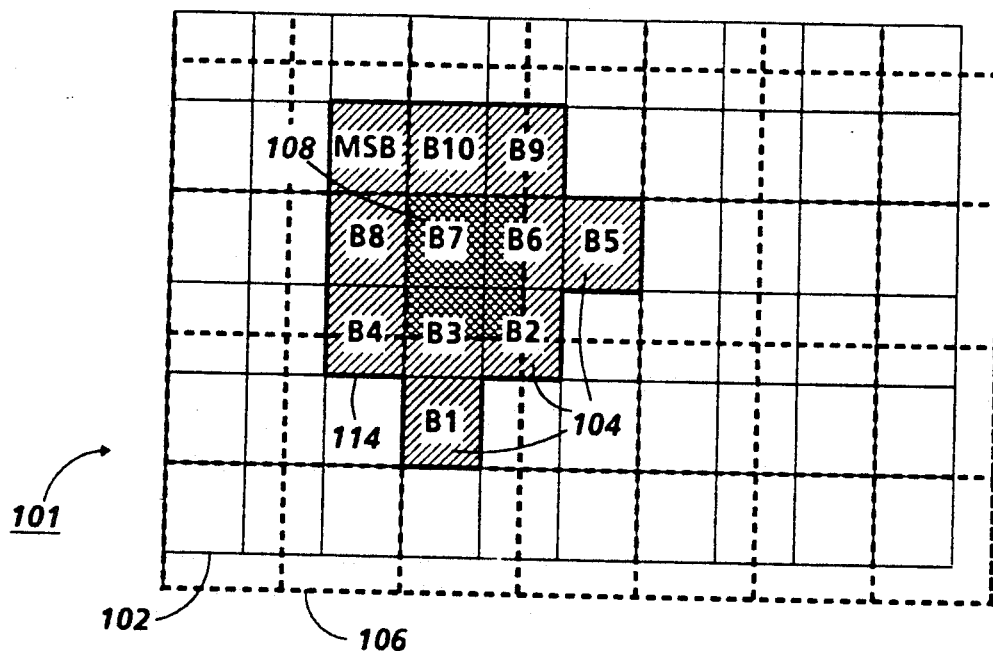
FIGS. 7A-7D are schematic views of four types of bitmaps generated during the conversion of an input image to an output image.

Hardware or software implementation of the present method is preferably achieved by repetitively solving Z for one of four generic cases. Referring to FIGS. 7A-7D, the four generic cases, representing four generic windows 114 formed during the method, are shown. The four generic cases are designated respectively as "DIAGRAM 3.0 PHASE 1 (ODD SCANLINE, ODD PIXEL)", "DIAGRAM 4.0 PHASE 2 (ODD SCANLINE, EVEN PIXEL)", "DIAGRAM 5.0 PHASE 3 (EVEN SCANLINE, ODD PIXEL)" and "DIAGRAM 6.0 PHASE 4 (EVEN SCANLINE, EVEN PIXEL)". Since the conversion of the present method is performed similarly for each of the four cases, detailed explanation of the method is reserved to just one of the four cases, namely the case illustrated by FIG. 7A and the accompanying first block of pseudocode shown below. Referring specifically to FIG. 7A, the input pixels 104 of the window 114 are designated B1 through MSB, these designations representing the sequence from the least significant bit B1 to the most significant bit MSB. The bit order of each of the input pixels 104 of the window 114 is indicated by use of an exemplary pointing arrangement in which the pointer is moved relative to one of the input pixels 104 centrally disposed about the Pivot Point ($X_C Y_C$). In the preferred embodiment, the bit order assignment of each input pixel 104 in the window 114 is made in general accordance with the degree to which each input pixel 104 correlates to the other surrounding input pixels 104. In the exemplary pointing arrangement, the pointer (K1,K2) is moved a preselected number of pixel lengths, relative to a centrally disposed input pixel 104, the centrally disposed input pixel 104 being substantially coincidental with the selected output pixel 108. The pointer can be moved in one of four directions, namely left, right, up or down. Movement of the pointer to the left or up is arbitrarily considered negative while movement of the pointer to the right or down is arbitrarily considered positive.

In the illustrated embodiment of FIG. 7A, the centrally disposed input pixel is designated B7, and MSB is assigned to the input pixel 104 in the upper left-hand corner. Since the MSB is one input pixel length to the left of B7, and one input pixel length above B7, the pointer position for the MSB is indicated as (K1-1,K2-1). Using similar reasoning, the pointer position of the input pixel 104 disposed directly above B7 by one input pixel length, i.e. B10, is indicated as (K1,K2-1). Referring to the bit designations of FIG. 7A, along with the two pointer position assignment examples for MSB and B10, one of ordinary skill in the art can readily reason what the pointer assignments should be for B1-B9.

Figure 7B:
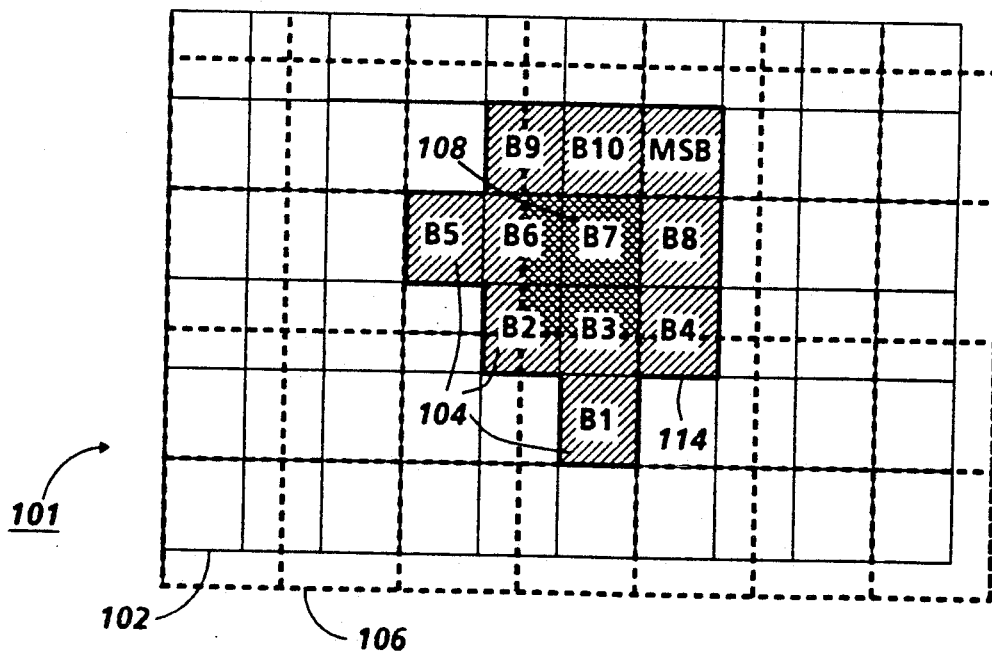
Figure 7C:
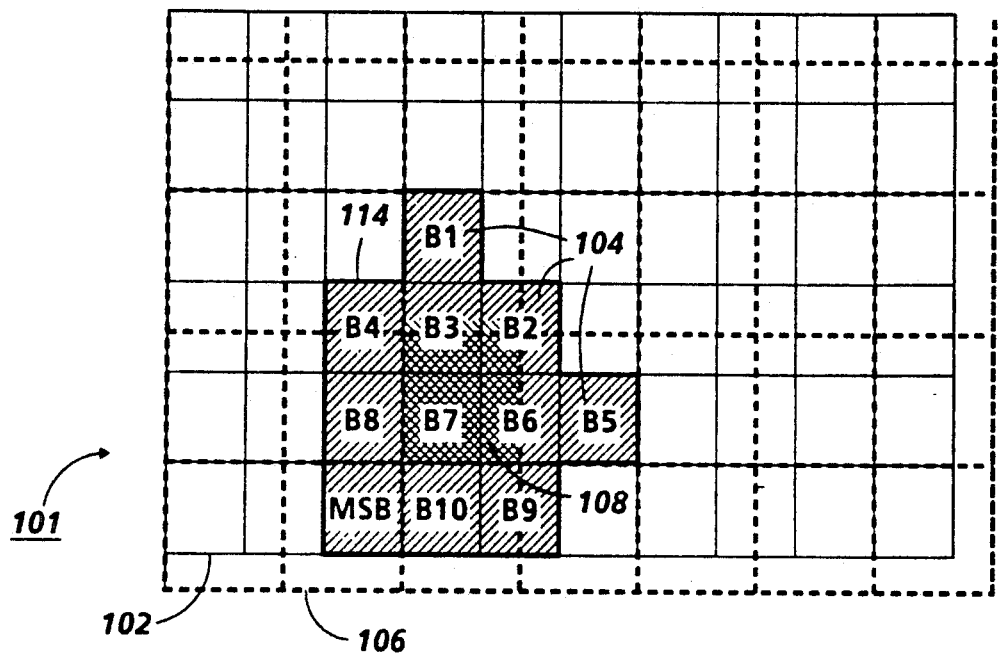
Figure 7D:
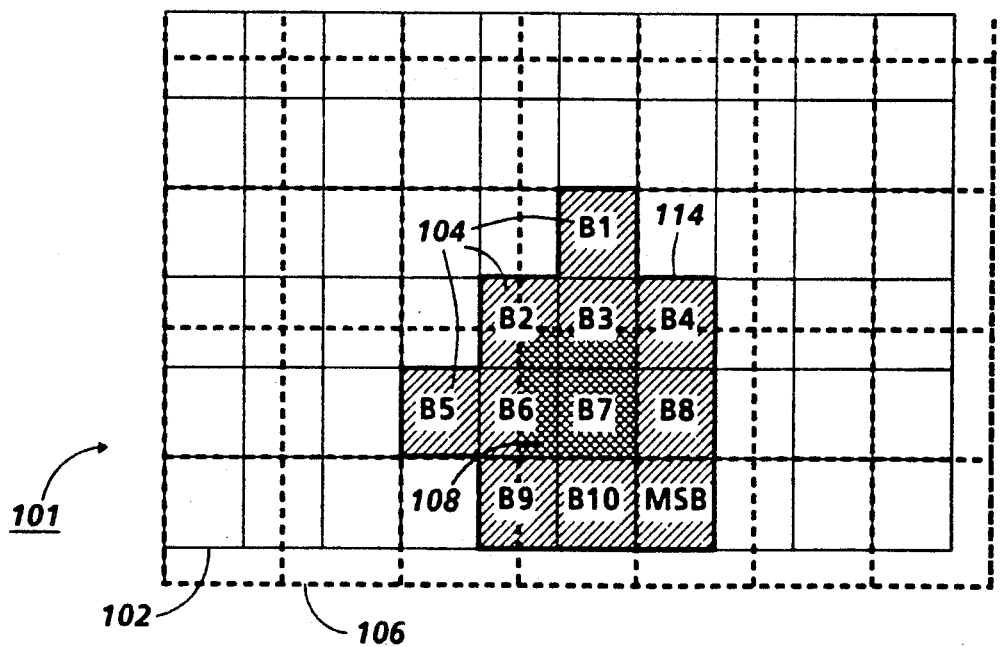

It should be recognized that the bit order in each window 114 preferably reflects the correlation of a set of input pixels 104 to a respective output pixel 108 via the Gaussian-like correlation function. Moreover, the correlated relationship among the bits is reflected in the index word L formed from the bits. As mapping of the input pixels 104 proceeds from left to right and top to bottom, the bits B1-MSB of each window 114 preferably maintain substantially the same spatial relationship, relative to a respective pivot point $(X_C, Y_C)$. During the software implementation, it may be necessary to rearrange the bit order in a given window 114 to maintain this desired spatial relationship. Accordingly, even though a similar physical relationship between B1-MSB is maintained in each of the illustrated embodiments of FIGS. 7A-7D, due to the asymmetry of the window 114, B1-MSB of FIGS. 7B-7D are rotated about axes of symmetry with respect to B1-MSB of FIG. 7A.

The appropriate pseudo-code used to generate the index word for each of the respective four cases illustrated by FIGS. 7A-7D is shown below:

(Pseudo-code) POTENTIAL SOFTWARE IMPLEMENTATION

```
FOR ALL J SCANLINES IN OUTPUT IMAGE
    FOR ALL I PIXELS OUTPUT IMAGE
        K1 = R*I      ... B7 PIXEL
        K2 = RC*J     ... B7 PIXEL
        L = 0
        IF J IS ODD
            IF I IS ODD - Phase 1 as shown in FIG. 7A
                L = I(K1-1,K2-1)
                SHIFT L RIGHT
                L = L &I(K1,K2-1)
                SHIFT L RIGHT
                L = L &I(K1+1,K2-1)
                SHIFT L RIGHT
                L = L &I(K1-1,K2)
                SHIFT L RIGHT
                L = L & I(K1,K2)
                SHIFT L RIGHT
                L = L &I(K1+1,K2)
                SHIFT L RIGHT
                L = L &I(K1+2,K2)
                SHIFT L RIGHT
                L = L &I(K1-1,K2+1)
                SHIFT L RIGHT
                L = L &I(K1,K2+1)
                SHIFT L RIGHT
                L = L &I(K1+1,K2+1)
                SHIFT L RIGHT
                L = L &I(K1,K2+2)
            ELSE I IS EVEN ... Phase 2 as shown in FIG. 7B
                L = I(K1+1,K2-1)
                SHIFT L RIGHT
                L = L &I(K1,K2-1)
                SHIFT L RIGHT
                L = L &I(K1-1,K2-1)
                SHIFT L RIGHT
                L = L &I(K1+1,K2)
                SHIFT L RIGHT
                L = L &I(K1,K2)
                SHIFT L RIGHT
                L = L &I(K1-1,K2)
                SHIFT L RIGHT
                L = L &I(K1-2,K2)
                SHIFT L RIGHT
                L = L &I(K1+1,K2+1)
                SHIFT L RIGHT
                L = L &I(K1,K2+1)
                SHIFT L RIGHT
                L = L &I(K1-1,K2+1)
                SHIFT L RIGHT
                L = L &I(K1,K2+2)
            END IF
        ELSE J IS EVEN
            IF I IS ODD ... Phase 3 as shown in FIG. 7C
                L = I(K1-1,K2+1)
                SHIFT L RIGHT
                L = L &I(K1,K2+1)
                SHIFT L RIGHT
                L = L &I(K1+1,K2+1)
                SHIFT L RIGHT
                L = L &I(K1-1,K2)
                SHIFT L RIGHT
                L = L &I(K1,K2)
                SHIFT L RIGHT
                L = L &I(K1+1,K2)
                SHIFT L RIGHT
                L = L &I(K1+2,K2)
                SHIFT L RIGHT
                L = L &I(K1-1,K2-1)
                SHIFT L RIGHT
                L = L &I(K1,K2-1)
                SHIFT L RIGHT
                L = L &I(K1+1,K2-1)
                SHIFT L RIGHT
                L = L &I(K1,K2-2)
            ELSE J IS EVEN ... Phase 4 as shown in FIG. 7D
                L = I(K1+1,K2+1)
                SHIFT L RIGHT
                L = L &I(K1,K2+1)
                SHIFT L RIGHT
                L = L &I(K1-1,K2+1)
                SHIFT L RIGHT
                L = L &I(K1+1,K2)
                SHIFT L RIGHT
                L = L &I(K1,K2)
                SHIFT L RIGHT
                L = L &I(K1-1,K2)
                SHIFT L RIGHT
                L = L &I(K1-2,K2)
                SHIFT L RIGHT
                L = L &I(K1+1, K-1)
                SHIFT L RIGHT
                L = &I(K1,K2-1)
                SHIFT L RIGHT
                L = L &I(K1-1,K2-1)
                SHIFT L RIGHT
                L = L &I(K1,K2-2)
            END IF
        END IF
        Z(I,J) = TABLE (L)
    NEXT I PIXEL
NEXT J SCANLINE
```

Data manipulation to achieve the pseudo-code is accomplished in a shift register of the processing means 116. It will be appreciated by those skilled in the art that while the pseudo-code is performed on a n-bit register, implementation of the pseudo-code could be achieved on other suitable hardware, such as cascaded flip-flops or the like. The index word L, which characterizes the intensity value of the selected output pixel 108 in FIG. 7A, is constructed by first loading the register, including bit locations $a_0$-$a_{11}$ (FIG. 8A), with the value for MSB in $a_0$ and 1s in $a_1$-$a_{11}$. While the intensity values of B1-MSB are binary in the present conversion example, in other contemplated examples, B1-MSB could be gray scale intensity values. Moreover, while the example illustrates 11 input pixels 104 being loaded into the register, the number of pixels 104 used to define window 114 and the size of register could both be increased without altering the concept underlying the method of the present invention.

After the bits in the register are shifted by one place to the right (FIG. 8B), a 1 is loaded into $a_0$. Referring to the pseudo-code and FIG. 8C, the effect of B10 on L is felt by "ANDing" L with a bit mask including the intensity value of B10. As will be appreciated by those skilled in the art, other masking operations could be used, without changing the results of the pseudo-code.

After the mask including the intensity value of B10 is ANDed with L, the bits of the register are shifted to the right (FIG. 8D) and another 1 is loaded into $a_0$. Referring to FIG. 8E, L is ANDed again with a mask including the intensity value of B9. Referring to FIG. 8F, the process of shifting the bits of the register, loading $a_0$, and ANDing L with a mask including the next available intensity value, is performed for B1-B8 until the characteristic index word, namely L, is obtained.

To obtain the intensity value Z of the respective selected output pixel 108 in FIG. 7A, L is matched with a reference word in the following Look-Up Table 1:

TABLE 1

| MSB B10 | B9 | B8 | B7 | B6 | B5 | B4 | B3 | B2 | B1 | PIXEL VALUE |
|---|---|---|---|---|---|---|---|---|---|---|
| 0   0 | 0 | 0 | 0 | 0 | 0 | 0 | 0 | 0 | 0 | 00 |
| 0   0 | 0 | 0 | 0 | 0 | 0 | 0 | 0 | 0 | 1 | 00 |
| 0   0 | 0 | 0 | 0 | 0 | 0 | 0 | 0 | 1 | 0 | 01 |
| .   . | . | . | . | . | . | . | . | . | . | .  |
| .   . | . | . | . | . | . | . | . | . | . | .  |
| 1   1 | 1 | 1 | 1 | 1 | 1 | 1 | 1 | 0 | 1 | 10 |
| 1   1 | 1 | 1 | 1 | 1 | 1 | 1 | 1 | 1 | 0 | 11 |
| 1   1 | 1 | 1 | 1 | 1 | 1 | 1 | 1 | 1 | 1 | 11 |

The Table 1 is developed by down-loading, into the processing means 116, each of the various reference words that L can assume, and assigning a suitable intensity value to each of the reference words. The distribution of the assigned intensity values in the Table 1 discretely varies as a function of W(i,j) of the Gaussian-like correlation function.

To summarize generally the concept underlying the software implementation, L is determined for a designated window 114 and matched with a reference word in Table 1. The reference words of Table 1 are ordered in a sequence and intensity values are assigned respectively thereto. Since the order of the sequence varys in accordance with the correlation function of Equation 11, the assigned intensity value corresponding to the matched reference word closely approximates the optimum intensity value for the selected output pixel 108 at a desired resolution. Referring to the pseudo-code above, it will be understood that the above-described technique for one selected output pixel 108 can be performed repetitively for each output pixel 108 in the bitmap 101 so that an optimum output image can be delivered to the IOT at the desired resolution.

What is claimed is:

1. A method for use in an electroreprographic machine of the type capable of manipulating digital images represented by a plurality of original image pixels, the electroreprographic machine having a buffering device for storing images and a raster output scanning device adapted to selectively discharge a photoreceptor member, the method including a step of developing an intensity signal for a selected output pixel in a set of output pixels from a plurality of input pixels in a set of input pixels, each of the plurality of input pixels having a corresponding intensity signal contributing to the intensity signal of the selected output pixel and being characterized by a center, the step of developing the intensity value of the selected output pixel comprising the steps of:

generating the intensity signals of the plurality of input pixels with an input signal device, the intensity signals being generated from an image with a constant resolution throughout;

receiving the intensity signals of the plurality of input pixels from the input signal device and storing the intensity signals of the plurality of input pixels to the buffering device;

mapping, in the buffering device, the set of output pixels to the set of input pixels so that each of the plurality of input pixels is adjacent the selected output pixel;

reading the plurality of input pixels from the memory;

determining a correlation value for each of the plurality of input pixels with a correlation function, the correlation function being based on a Gaussian correlation function, the Gaussian correlation function being characterized by the following expression:

$$W(i,j) = C*(e^{-0.5(x(i)-X_c)/\sigma_x)^2} * e^{-0.5*(y(i)-Y_c)/\sigma_y)^2});$$

and where,

C is a normalization constant, x(i) and y(i) are locations of the input pixels of the input image, $X_C$ and $Y_C$ are points about which a window of the input pixels is centered, and $\sigma_x$ and $\sigma_y$ are distances varying as a function of the perimeter of the window of the input pixel;

summing the correlation values of the plurality of input pixels with the corresponding respective intensity signals of the plurality of input pixels to obtain the intensity signal of the selected output pixel, the selected output pixel being characterized by a resolution which is different than the resolution of the image from which the intensity signals of the plurality of input pixels were generated, the intensity signal of the selected output signal being employed to selectively control the raster output scanning device;

designating a pivot point ($X_C$, $Y_C$) for the selected output pixel; and disposing the centers of the plurality of input pixels substantially within a window centered about the pivot point.

2. The method of claim 1, in which the window is characterized by a size, further comprising the step of varying the size of the window as a function of the correlation function.

3. The method of claim 1, wherein the step of disposing the centers of the plurality of input pixels comprises the step of disposing the centers of the plurality of input pixels substantially within an ellipse.

4. The method of claim 1, further comprising the step of optimizing the size of the window.

5. A method for use in a system of the type capable of manipulating digital images represented by a plurality of original image pixels, the system having a buffering device for storing images and means for outputting the images, the method including a step of an intensity signal for a selected output pixel in a set of output pixels from a plurality of input pixels in a set of input pixels, each of the plurality of input pixels having a corresponding intensity signal contributing to the intensity signal of the selected output pixel and being characterized by a center, the step of deriving the intensity signal of the selected output pixel comprising the steps of:

generating the intensity signals of the plurality of input pixels with an input signal device, the intensity signals being generated from an image with a constant resolution throughout;

receiving the intensity signals of the plurality of input pixels from the input signal device and storing the intensity signals of the plurality of input pixels to the buffering device;

mapping, in the buffering device, the set of output pixels to the set of input pixels so that each of the plurality of input pixels is adjacent the selected output pixel;

reading the plurality of input pixels from the memory;

determining a correlation value for each of the plurality of input pixels with a correlation function, the correlation function being based on a Gaussian correlation function, the Gaussian correlation function being characterized by the following expression:

$$W(i,j) = C*(e^{-0.5(x(i)-X_c)/\sigma_x)^2} * e^{-0.5*(y(j)-Y_c)/\sigma_y)^2});$$

and where,

C is a normalization constant, x(i) and y(i) are locations of the input pixels of the input image, $X_c$ and $Y_c$ are points about which a window of the input pixels is centered, and $\sigma_x$ and $\sigma_y$ are distances varying as a function of the perimeter of the window of the input pixel;

summing the correlation values of the plurality of input pixels with the corresponding respective intensity signals of the plurality of input pixels to obtain the intensity signal of the selected output pixel, the selected output pixel being characterized by a resolution which is different than the resolution of the image from which the intensity signals of the plurality of input pixels were generated;

designating a pivot point ($X_C$, $Y_C$) for the selected output pixel; and disposing the centers of the plurality of input pixels substantially within a window centered about the pivot point.

6. The method of claim 5, in which the window is characterized by a size, further comprising the step of varying the size of the window as a function of the correlation function.

7. The method of claim 5, wherein the step of disposing the centers of the plurality of input pixels comprises the step of disposing the centers of the plurality of input pixels substantially within an ellipse.

8. The method of claim 5, further comprising the step of optimizing the size of the window.

9. A method for use in a system of the type capable of manipulating an input image represented by a set of input image pixels and characterized by a first resolution, the system having a buffering device for storing a first set of image intensity signals corresponding with the first set of input image pixels, comprising the steps of:

storing the first set of image intensity signals in the buffering device;

mapping, in the buffering device, a set of output image pixels, corresponding with a second set of image intensity signals, to the set of input image pixels so that each second set image intensity signal is associated with a selected number of first set image intensity signals;

for each of the second set image intensity signals, forming a multi-bit index word, with a processor, from the selected number of first set image intensity signals associated therewith;

providing a table, in nonvolatile memory, of a plurality of preselected reference words and intensity signals respectively assigned thereto, the plurality of preselected reference words and respectively assigned intensity signals being ordered in a sequence, the sequence varying in accordance with a correlation function; and matching each multi-bit index word, obtained per said forming step, with one of the preselected reference words and its respectively assigned intensity signal so as to develop an output image represented by the set of output image pixels with the output image being characterized by a second resolution.

10. The method of claim 9, wherein the correlation function is based on a Gaussian correlation function.

11. The method of claim 10, wherein the Gaussian-like correlation function is characterized by the following expression:

$$W(i,j) = C*(e^{-0.5(x(i)-X_c)/\sigma_x)^2} * e^{-0.5*(y(j)-Y_c)/\sigma_y)^2})$$

where,

C is a normalization constant, x(i) and y(i) are locations of the input pixels of the input image, $X_c$ and $Y_c$ are points about which a window of the input pixels is centered, and $\sigma_x$ and $\sigma_y$ are distances varying as a function of the perimeter of the window of the input pixels.

12. The method of claim 9, wherein the step of forming a multi-bit index word includes the step of sequentially loading each of the plurality of input pixels into a register having a preselected number of bits.

* * * * *